(12) United States Patent
Cameron et al.

(10) Patent No.: US 7,822,200 B2
(45) Date of Patent: Oct. 26, 2010

(54) METHOD AND SYSTEM FOR ASYMMETRIC KEY SECURITY

(75) Inventors: Kim Cameron, Bellevue, WA (US);
Arun K. Nanda, Sammamish, WA (US);
Josh D. Benaloh, Redmond, WA (US);
John P. Shewchuk, Redmond, WA (US);
Daniel R. Simon, Seattle, WA (US);
Andrew Bortz, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 1151 days.

(21) Appl. No.: 11/074,885

(22) Filed: Mar. 7, 2005

(65) Prior Publication Data

US 2006/0198517 A1 Sep. 7, 2006

(51) Int. Cl.
*H04L 9/00* (2006.01)
(52) U.S. Cl. .............................. 380/44; 726/5; 380/278; 380/30; 713/168
(58) Field of Classification Search .................... None
See application file for complete search history.

(56) References Cited

U.S. PATENT DOCUMENTS

| | | | | |
|---|---|---|---|---|
| 6,853,988 | B1 * | 2/2005 | Dickinson et al. | 705/75 |
| 7,373,505 | B2 | 5/2008 | Seltzer et al. | 713/166 |
| 7,555,784 | B2 | 6/2009 | Cameron et al. | 713/201 |
| 7,624,110 | B2 | 11/2009 | Alagna et al. | 707/9 |
| 2003/0081785 | A1* | 5/2003 | Boneh et al. | 380/277 |
| 2004/0123157 | A1 | 6/2004 | Alagna et al. | |
| 2005/0149442 | A1 | 7/2005 | Adams et al. | 705/51 |
| 2005/0235351 | A1 | 10/2005 | Seltzer et al. | |
| 2006/0200667 | A1 | 9/2006 | Cameron et al. | 713/168 |

FOREIGN PATENT DOCUMENTS

EP  1 478 121 A2  11/2004
WO  WO2005/098630  10/2005

OTHER PUBLICATIONS

Extended European Search Report for EP 06 10 1313.
Official Communication, European Patent Office, dated Dec. 17, 2008, regarding App. No. EP 06 110 218.2-2212.
Extended European Search Report, dated Jul. 24, 2006, regarding App. No. EP 06 110 218.2.
Zhang, et al. "Anonymous public-key certificates for anonymous and fair document exchange," Dec. 2000, pp. 345-350.
Menezes, et al. "Chapter 10: Identification and Entity Authentication," Handbook of Applied Cryptography, 1997, pp. 385-424.
Non-Final Office Action dated Oct. 2, 2008 in U.S. Appl. No. 11/073,404 (now U.S. Patent No. 7555784), 8 pages.

(Continued)

*Primary Examiner*—Jung Kim
(74) *Attorney, Agent, or Firm*—Merchant & Gould PC

(57) ABSTRACT

Exemplary embodiments disclosed herein may include a method and system for creating pair-wise security keys, comprising receiving an identity key from a website, generating a master key, creating a pair-wise symmetric key or asymmetric key pair by utilizing an encryption function of the identity key and the master key, and storing the pair-wise public or symmetric key at the client and the website.

18 Claims, 6 Drawing Sheets

OTHER PUBLICATIONS

Notice of Allowance dated Mar. 16, 2009 in U.S. Appl. No. 11/073,404 (now U.S. Patent No. 7555784), 6 pages.
Non-Final Office Action dated Jun. 10, 2008 in U.S. Appl. No. 11/074,972, 15 pages.
Final Office Action dated Dec. 24, 2008 in U.S. Appl. No. 11/074,972, 18 pages.
Non-Final Office Action dated Jul. 8, 2009 in U.S. Appl. No. 11/074,972, 22 pages.
Notice of Allowance dated Feb. 3, 2010 in U.S. Appl. No. 11/074,972, 14 pages.
Official Communication, European Patent Office, dated Mar. 12, 2007 regarding App. No. EP 06 110 218.2, 1 page.
Official Communication, European Patent Office, dated Dec. 13, 2007 regarding App. No. EP 06 110 218.2, 3 pages.
Official Communication, European Patent Office, dated Apr. 17, 2007 regarding App. No. EP 06 101 313.2, 1 page.
John Callas, "Identity-Based Encryption with Conventional Public-Key Infrastructure", 14 pages, Feb. 18, 2005, http://middleware.internet2.edu/pki05/proceedings/callas-conventional_ibe.pdf.
EP Examination Report dated Jul. 15, 2010 in European Application No. 06 110 218.2 —2212; 4 pages.
Translation of Second Chinese Office Action dated Jun. 28, 2010 in Chinese Patent Application No. 200610003730.2; 7 pages.

* cited by examiner

METHOD AND SYSTEM FOR ASYMMETRIC KEY SECURITY

TECHNICAL FIELD

The invention relates generally to the field of electronic security, such as computer and network security. More particularly, the invention relates to authenticating the identity of computer systems and users.

BACKGROUND

Typical electronic security may utilize public key/private key systems to authenticate parties accessing resources over networks such as the Internet. These public key/private key systems operate with one public key that is constant and utilized for many different resources such as websites, and one private key that is accessible by only the originator, such as a client computer accessing the resources. This electronic security key system has significant disadvantages, including that the fixed key identifying the originator may be utilized by the many different websites to obtain much information about the originator and their habits, references, etc. This may be accomplished by the various website operators matching public keys, and exchanging information corresponding to the matched public keys. Furthermore, operators of websites may exchange information about an originator freely on an ongoing basis once the public keys are matched, to obtain more information about a user's habits, etc.

SUMMARY

Exemplary embodiments disclosed herein may include a method and system for alleviating the disadvantages noted above, as well as others. Exemplary embodiments disclosed herein involve a method and system for creating asymmetric key pair(s) comprising generating a master key, receiving an identity key from a server, creating a seed by utilizing an encryption or hashing function of the identity key, the master key, and a constant(s), and using this seed as the input to a process which creates a key or key pair. In an exemplary embodiment disclosed herein, the seed is used to create an asymmetric key pair, and the resulting public asymmetric key is stored at the server.

Other embodiments involve a system and method for authenticating a website and/or server or user system comprising, producing the public asymmetric key on a client computer, determining if that public asymmetric key matches a corresponding asymmetric key available on the server, and authenticating the server and/or client if the asymmetric key is matched.

Yet other embodiments involve a system and method for authenticating a website and/or server or user system comprising, generating a master key, receiving an identity key from a server, creating a seed by utilizing an encryption function of the identity key, the master key, and a constant(s), and using this seed as the input to a process which creates a safe symmetric key, and determining if that symmetric key matches a corresponding symmetric key available on the server by initiating a symmetric authentication process between the server and client.

Exemplary embodiments disclosed herein may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present disclosure and its improvements can be obtained by reference to the accompanying drawings, which are briefly summarized below, and to the following detailed description of presently preferred embodiments of the invention, and to the appended claims.

DETAILED DESCRIPTION

Figure 1:
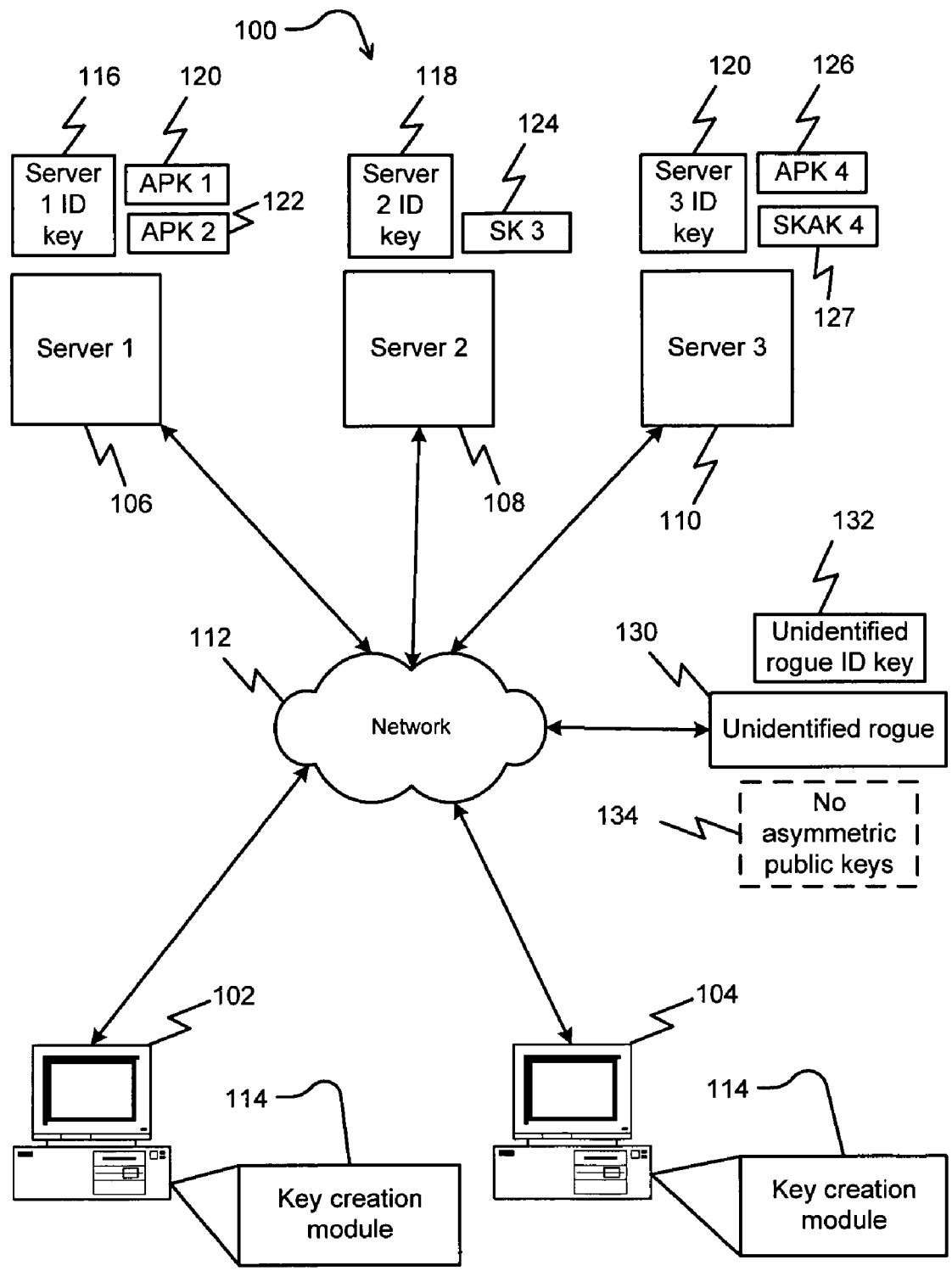
FIG. 1 is a block diagram of a system for creating an asymmetrical key pair(s), and recognizing of an ongoing digital relationship according to an exemplary embodiment.

FIG. 1 is a block diagram of a system, which may be utilized for creating an asymmetrical key pair(s) and authenticating identification according to an exemplary embodiment, generally at 100. In this embodiment, system 100 has clients 102, 104. Clients 102, 104 are connected to a network 112, which, in turn is connected to Server 1 106, Server 2 108, and Server 3 110. Network 112 may be the Internet, or other communication channel, which may be utilized to communicate between clients 102 and 104 and servers 106, 108, 110. Those skilled in the art will appreciate that system 100 is merely an exemplary communication system with clients and servers, and that many alternative and different configurations may be utilized.

In this embodiment, clients 102 and 104 have key creation modules 114 and 115, respectively. Key creation modules 114 and 115 are capable of creating a symmetrical key(s) and/or an asymmetrical key pair(s).

In an exemplary embodiment involving asymmetrical keys, the asymmetrical key pair(s) are unique values calculated based on known inputs such that their value can be reproduced by repeating the same function with the same input values. The fixed identification keys of the servers and/or the public keys generated by the key creation modules on the clients are then used to do mutual authentication That is, the client can validate the server and vice versa.

The clients 102 and 104 request and send information to the servers 106, 108, 110. Likewise, the servers 106, 108, 110 receive requests for information and attempt to respond. Moreover, the servers may themselves request information from the clients. At times, sensitive information is sent to the servers. In order to protect the servers and the clients, system 100 incorporates symmetrical or asymmetrical key security. Using these security features, client systems are relatively protected from improper server techniques trying to steal information.

Client 102 may request an identification key 116 that is associated with Server 1 106. Client 102 may then create a master key and utilize identity key 116, the master key, and a constant(s) to create an asymmetrical key pair, which includes an asymmetric public key (APK) 1 120, utilizing key creation module 114. Asymmetric public key 1 120 may then be stored on server 1 106, and a corresponding private asymmetrical key may be stored at client 102, such that when client 102 again visits server 1 106, and/or a user of client 102 visits server 1 106 again, it may request proof of knowledge of the asymmetric public key 1 120 such that it may determine if it has previously accessed server 1 106. This embodiment may also be utilized to determine the authenticity of server 1 106 and/or an associated web site via the asymmetric public key 1 120. Furthermore, client 102 may discard the private asymmetric key, later recreating the asymmetric key pair and presenting the asymmetric public key when accessing the server again to prove to the server that an ongoing digital relationship exists.

Client 102 may present a recreated asymmetric public key when accessing Server 1 106 again to validate the client 102 to Server 1 106. Both the client 102 and server 1 106 may require further assurances from the other to validate identity. These further assurances may be in a form such that only a holder of either the public or private key from the pair may decrypt, understand, and/or be able to respond.

When using asymmetric key mechanisms, since client 102 generates a different key pair for each server 106, 108 and 110, and communicates the public key using an encrypted channel, it may be enough to only present proof of knowledge of the asymmetric public key to validate identity. This means the asymmetric public key may function as a symmetric key when this is convenient. In other cases the server may elect to require proof of possession of the associated private key.

Similarly, another client 104 may also access server 1 106 and request server 1 ID key 116. Server 1 ID key 116 also may be obtained by requesting a certificate, or security certificate from a third party, and parsing the certificate to obtain the identity key, or other identity information. It will be appreciated that other methods and systems for obtaining an identity key and/or security certificate may be utilized without straying from the concepts disclosed herein. Similarly, client 104 may also create an asymmetric public key (APK) 2 122 utilizing ID key 116, a different master key, and optionally a constant(s). Client 2 104 may then associate asymmetric public key 2 122 with server 1 106. Client 104 may then save a corresponding private asymmetric key, or discard it and recreate the key pair when subsequently accessing the server.

Asymmetrical public key 2 122 may be created by a key creation module 114 associated with client 104. Similarly to the method described previously, when client 104 subsequently accesses server 1 106 it may request proof of knowledge of asymmetric public key 2 122 such that it may determine if it has previously accessed server 1 106 and/or provided some identity information to server 1 106. Similarly, client 104 may recreate and demonstrate proof of knowledge of asymmetric public key 2 122 to server 1 106 to authenticate the identity of the client 104, or may require proof of possession of the associated private key.

Furthermore, client 1 102 may access server 2 108 and request server 2 ID key 118. After receiving ID key 118 client 102 may then utilize ID key 118 and another, or the same, master key, and a constant(s) to create symmetric key 3 (SK) 124 (in this case the seed is fed into a module generating a symmetric key rather than an asymmetric key pair). The symmetric key is then communicated to server 2 108 using an encrypted channel.

Client 102 may then request proof of knowledge of symmetric key 3 124 when accessing server 2 108 again. Similarly, the server can require proof of knowledge of the key by the client. Only the user would have the master key, etc. used to create the symmetric key. Client 102 may store different symmetric keys at each and every web site and/or server visited, and may be able to request proof of knowledge of those keys to determine if the server has been previously accessed. Furthermore, symmetrical keys may be utilized to authenticate a server, client, and/or web site as only the particular client or user that stored the symmetric key at the server will be able to pass the required mutual authentication.

Similarly, client 104 may access server 3 110 and request server 3 identification key 120. Client 104 may then utilize key creation module 114 to generate a random master key that will be utilized along with server 3 ID key 120 and optionally a constant to create asymmetric public key (APK) 4 126 which may then be stored at, or associated with, server 3 110. Then client 104 may also encrypt the asymmetric key pair under a symmetric key such as one derived from a master key, server 3 identification key and some constant, storing this symmetric key made utilizing the asymmetric key pair as seed (SKAK) 127 on server 3 in association with asymmetric public key APK 4 126 and the associated identity of the server. Because the symmetric key utilizing asymmetric keys 127 is encrypted, only client 104 will be able to decrypt it, or utilize the information to retrieve the asymmetric key pair. Therefore, the symmetric key utilizing asymmetric keys 127 may be utilized by client 104 to determine if client 104 has previously accessed server 3 110. Furthermore, this configuration may be utilized to authenticate a website and/or server, as only a previously visited server would have an associated the symmetric key utilizing asymmetric keys from a particular client. Yet further, a client capable of decrypting the symmetric key utilizing asymmetric keys when visiting a server may utilize the asymmetric public key to authenticate their own identity to the server.

As described above, dishonest people may try to trick a client, and/or a user of a client, into providing personal information. Unidentified rogue 130 may try to copy or look like a legitimate server and/or web site to obtain identity and/or other information from a client 102, 104. With the exemplary embodiments disclosed herein, when the client requests an identity key, unidentified rogue ID key 132 will be provided to the client and, thus, the client may discern that it is not a server previously visited. Furthermore, when the client requests an asymmetric public key, unidentified rogue will have no an asymmetric public key(s) (APK) 134 as the client and/or user has not previously accessed the website of the unidentified rogue. Either of these scenarios would alert a user of a client 102, 104 that the web site and/or server is not to be trusted, and the user should be wary of disclosing identity or other information.

Similarly, if unidentified rogue 130 tries to access any of the servers to obtain identity information of a client, the unidentified rogue 130 will not be able to demonstrate knowledge of symmetric or asymmetric key required to pose as client or server.

With this exemplary embodiment a server, user and/or client may have another level or two of security that may inhibit unidentified rogues from obtaining personal information by spoofing a web site. Furthermore, this may also inhibit the "man in the middle" interception of information to provide further security.

Since the site-specific asymmetrical public keys or symmetric keys are stored at the servers and/or web sites, a user may take their master key to many different clients and access web sites, and still be somewhat secure in the fact that they are dealing with an authentic web site. Again, they may utilize the server identification key along with their master key(s), and constant(s) to request proof of knowledge of the site's symmetric or public asymmetric keys; or they may request and decrypt the opaque key blob saved at, or associated with, the web site to determine if they have previously visited the server and/or web site. This may also be attractive to users who use multiple machines at home, work, the library, etc. in that they may have much greater comfort in dealing with web sites. It is a significant and central characteristic of this system that the master key needs only to be transported to a new device or computer on one occasion. From it, all site-specific keys and proofs of an ongoing digital relationship can be deduced. This eliminates the need for ongoing resynchronization.

This may be attractive to servers and operators of websites, who may be concerned about fraud. This may provide an extra level of user-generated security that may inhibit unidentified users obtaining confidential information.

Figure 2:
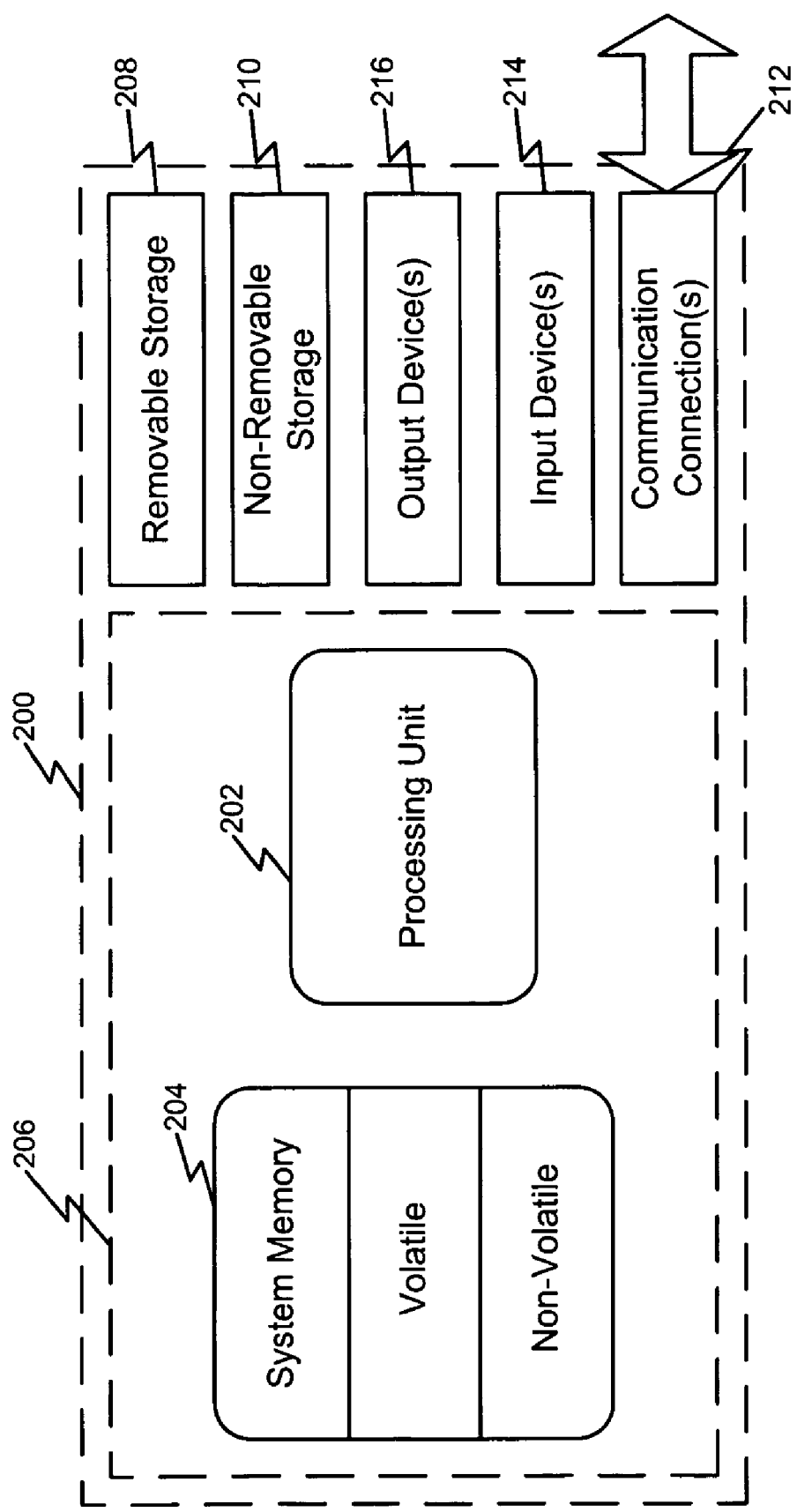
FIG. 2 illustrates an example of a suitable computing system environment on which exemplary embodiments may be implemented.

FIG. 2 illustrates an example of a suitable computing system environment on which embodiments of the invention may be implemented. This system 200 is representative of one that may be used to serve as a client and/or a server as described above. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well known in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

Figure 3:
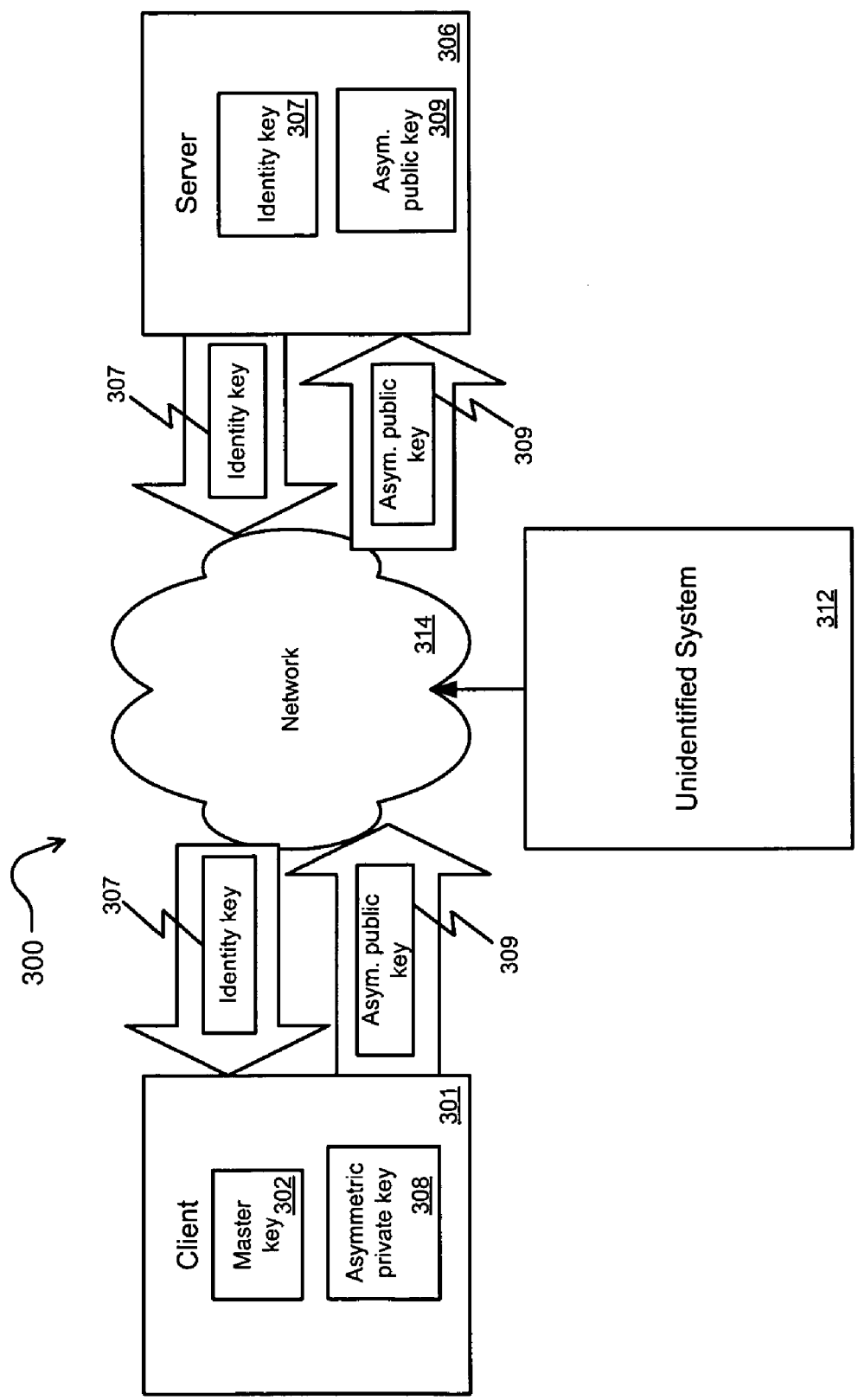
FIG. 3 is a block diagram of a system for creating an asymmetrical key pair(s) and authenticating a system according to an exemplary embodiment.

FIG. 3 illustrates, at a conceptual level, a system for asymmetrical security key exchange according to an exemplary embodiment, generally at 300. This example illustrates system 300 including a client 301 and a server 306 connected via a network 314 or other channel. As will become apparent, most devices can function as both a client 301 and a server 306 at various times. However, for simplicity, these functions are illustrated separately here. Additionally, network 314 may be almost any type of network including the Internet or may be some other type of channel suitable for establishing communication between the client 301 and the server 306.

Client 301 may be a client, such as a personal PC accessing a website, or server 306 via the Internet. It will be appreciated, however, that other devices and configurations may be utilized without straying from the concepts disclosed herein. Similarly, the server 306 may be a host for a website, device, or other system, or other configuration.

The server 306 has an associated identity key 307. Identity key 307 has information about the server, among other information. In an embodiment, the information relates to components of the URL, name of the principal owning or operating the system, and/or other "identity" information. When accessing the server 306, the client 301 may request an identity key 307, and/or the identity key 307 may be provided to the client 301 by the server or other entity. Although identity key 307 is shown here as residing or originating from server 306, it will be appreciated that identity key 307 may reside or originate from another source, including but not limited to, a verification entity, among others.

In another exemplary embodiment, client 301 receives a certificate containing information about server 306. The information contained within the certificate includes identity key 307, or other identity information. Client 301 parses the certificate to access the identity key 307. As described above the certificate may originate from the server, a verification entity, and/or other entity.

The identity information is then used by the client to create a unique asymmetric public key (or symmetric key) 309 that is stored at the server. The key 309 is a function of the identity information of the server, a master key generated by the client, and optionally a constant(s). The function may be such that the components utilized to create the function may not be discernable from the final product (i.e. encrypted).

Client 301 may previously have created a master key 302. Master key 302 may be a randomly generated number and/or a variety of different types of information including, but not limited to, a time stamp, identity information and the like, or other information or combinations thereof. Client 301 may then utilize an encryption function of the combination of the master key 302 and the identity key 307, and a constant(s) to create one or more seeds used to generate an asymmetric key pair including private key 308, and public key 309. Thus asymmetric keys 308 and 309 may be created for each server 306 and/or website visited. Alternately, the seed or seeds may be used to generate a symmetric key that can be communicated through an encrypted channel again shown as 309.

The key 309 may then be stored on the server 306. In the asymmetric case, the asymmetric private key may be stored at the client 301 or discarded and the keys recreated when subsequently accessing the server. When the client 301 accesses the server 306 again, the client 301 may request and/or receive proof of knowledge of the key 309 by server 306 and compare it to a recreated key on its own system to determine if the client 301 has previously accessed the server 306. The server 306 may also utilize this method to determine if the client 301 has previously visited the server 306, or in the asymmetric case may require the client to show proof of knowledge of the private key 308.

This information may also be utilized to determine the authenticity of the server 306, such that the client 301 and the principal using the client 301 may be more confidant that the server 306 and/or associated website are authentic and/or legitimate. This may reduce fraud, and increase user confidence before the user discloses identity information or other information to the server 306, as well as many other benefits.

Proof of knowledge may include submitting a digital signature over some information employing a secret that can be verified and/or understood by an entity knowing the secret and/or having the seed(s) and the key. By requesting proof of knowledge of the key previously stored at the server, a user can identify the server/web site, and then can be more certain when disclosing information to the server. Exemplary embodiments may decrease the likelihood that an unidentified system 312 may try to obtain identity information from the client 301 by posing as a previously accessed server 306. Furthermore, a server 306 may also utilize the asymmetric private key 308 to determine the authenticity of a client 301 trying to access the server 306 and/or changing or obtaining information about a specific client.

Once created, the asymmetric public key or symmetric key is stored on the web server, or in association with the website for which that key has been created. As a result, the user can revisit the site, and quickly verify/recognize the site through a challenge of the site to demonstrate knowledge of the key. Furthermore, since each system visited may be given a unique pair-wise key the operators of the different systems may not compare keys to collaborate and share information about the client or a user.

The encryption used for proof of knowledge may be an AES 256 function or may be based on a public key algorithm such as RSA, depending on the situation. However, it will be appreciated that other encryption algorithms, functions, and configurations may be utilized without straying from the concepts disclosed herein.

This information may also be utilized to determine the authenticity of the server 306, such that the client 301 and the user of the client 301 may be more confident that the server 306 and/or associated websites and systems are authentic and/or legitimate. Among other benefits, this may reduce fraud, and increase user confidence before the user discloses identity information or other sensitive information to the server 306. This authentication may provide consistent recognition of an ongoing digital relationship.

If the client 301 receives anything other than an expected proof of possession of the key 309, this may indicate that the client 301 has not previously accessed this server 306. This may also indicate that the legitimate site is being imitated, or that the server 306 has lost the key, among other scenarios. This may indicate to the user of the client 301 that the server 306 is not trustworthy, and that the user should disconnect from the server 306, or proceed with caution and/or not divulge any sensitive, confidential, and/or identity information.

A further benefit of the embodiment shown in FIG. 3 is that a user may access a website and/or a server 306 from many different clients with the original master key, and still have a level of assurance that the website is legitimate.

Figure 4:
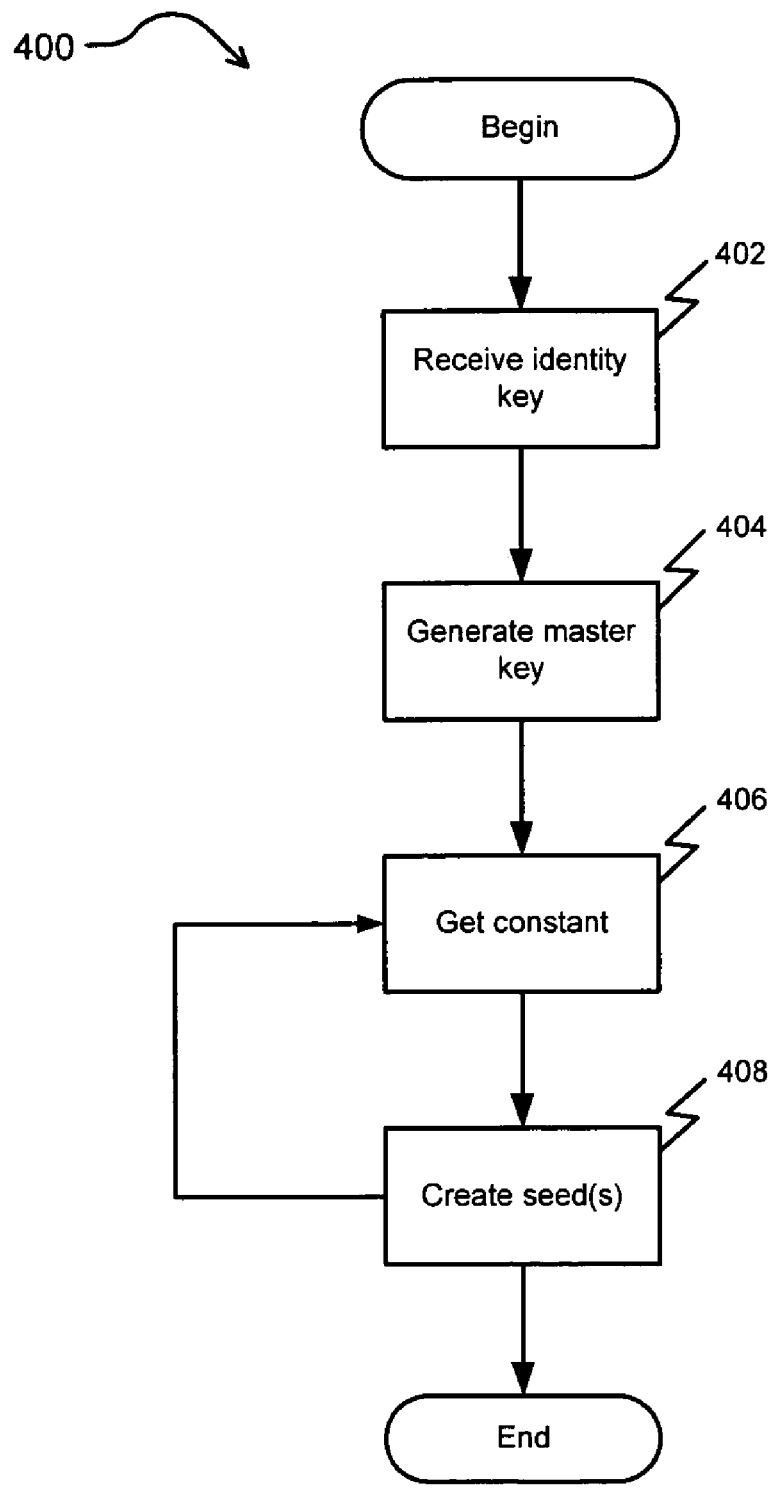
FIG. 4 is a flow diagram illustrating operational characteristics involved in creating an asymmetrical key pair(s) and recognizing an ongoing digital relationship according to an exemplary embodiment.

FIG. 4 is a flowchart illustrating an exemplary embodiment of a method for creating pair-wise security keys according to an exemplary embodiment, generally at 400. Method 400 includes receive operation 402. Receive operation 402 includes receiving an identity key from a server or other entity. The identity key may include identity information about the server, including, but not limited to a unique URL, a principal owning the system, and/or other identification information. Furthermore, the identity key may be a portion of a certificate, such as a security certificate, or other certificate, that is associated with the server. The identity key may be parsed out of the certificate. Control then passes to generate operation 404.

Generate operation 404 may include generating a master key. The master key may be a random number, identity information, or other unique information and/or combinations thereof. The master key may also have been previously generated and reused for different applications. It will be appreciated that the master key should be stored in a very secure place that will not allow an unauthorized person or entity to break in and view and/or steal the information. Control then passes to get operation 406.

Get operation 406 includes getting a constant(s). The constant(s) may be a randomly created number, or other information, and/or combinations thereof. The constant(s) may only be known to the user who creates the constants, such that they may be reproduced at a later time, when needed. Control then passes to the create function 408.

Create operation 408 may include creating seed as a function of the identity key, the master key, and a constant(s). It will be appreciated that other information and/or combinations of information may be utilized without straying from the concepts disclosed herein. The function may be a one-way encryption of the above information, such that the original information may not be determinable from the resultant seed. This function may be an AES encryption function or other encryption function or algorithm and/or combinations thereof. If a range of seeds needs to be produced, control may pass back to the get function 406 to get another constant to be utilized in creating another seed utilizing a different constant. The seed(s) may then be utilized by an asymmetric key pair generator to create an asymmetrical key pair(s), or by a symmetric key generating or validation function to create a symmetric key.

Figure 5:
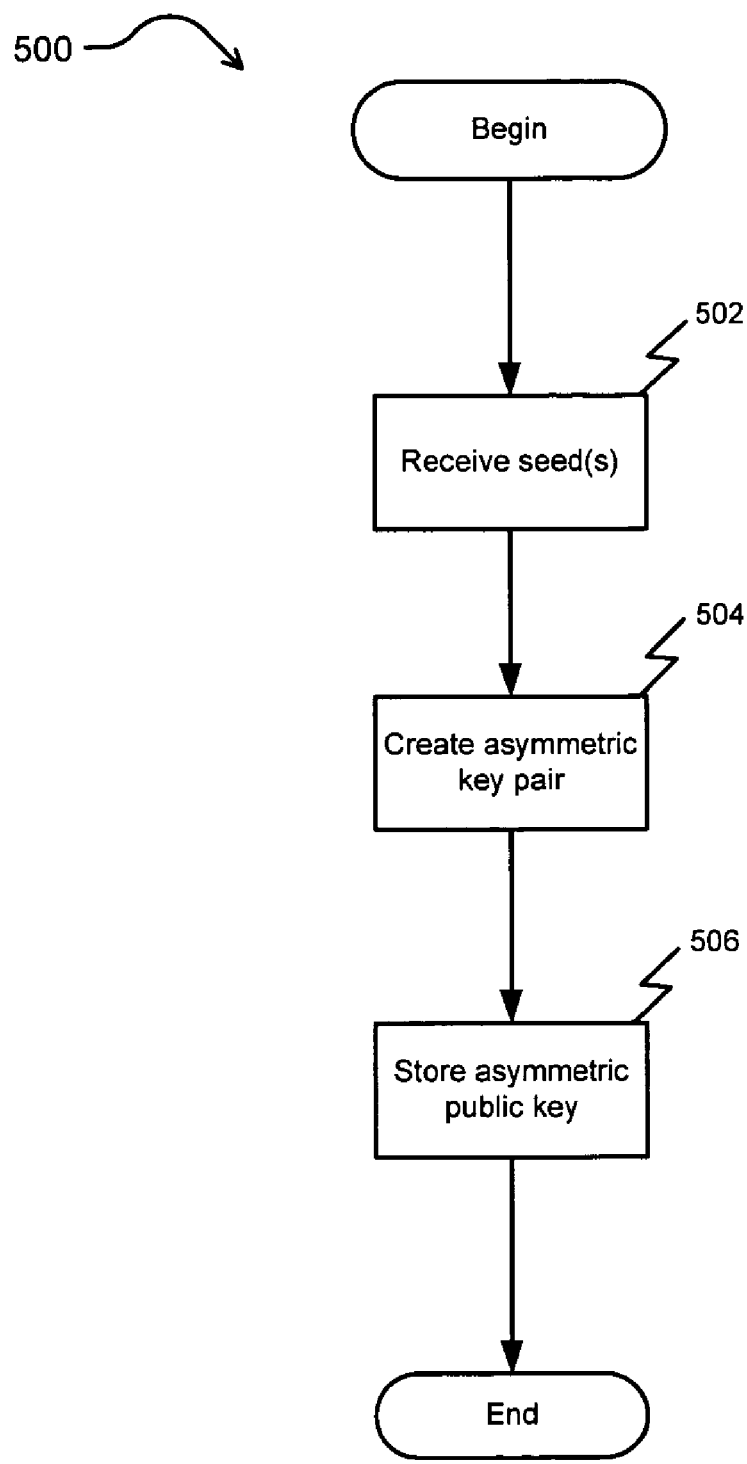
FIG. 5 is a flow diagram illustrating further operational characteristics involved in creating an asymmetrical key pair(s) and recognizing an ongoing digital relationship according to an exemplary embodiment.

FIG. 5 is a flow diagram illustrating further operational characteristics involved in creating an asymmetrical key pair (s) and recognizing an ongoing digital relationship according to an exemplary embodiment, generally at 500.

Method 500 include receive function at 502. Receive operation 502 includes receiving a previously created seed(s). Seed(s) are created as described above. Control then passes to the create function 504.

Create function 504 includes creating an asymmetric key pair utilizing the received seed(s). One or more seed(s) may be utilized in the creation of the asymmetric key pair. The number of seed(s) used may depend on the particular type of asymmetric key pair generator used. Control then passes to the store function 506.

Store operation 506 may include storing an asymmetric public key at the server and/or associating the asymmetric public key with the server or web site. The asymmetric public key is associated with the server such that it may be accessed by the client when the client accesses the server again. Furthermore, it may be accessed by the user from another system, such that a user may authenticate or recognize a system or website from many different devices or systems. The client may also recreate the asymmetric public key and present it when subsequently accessing the server again to validate the identification of the client. In this manner, the client may determine if the server has been previously accessed. Furthermore, this information may be utilized to determine the authenticity and/or legitimacy of the server and/or client.

Figure 6:
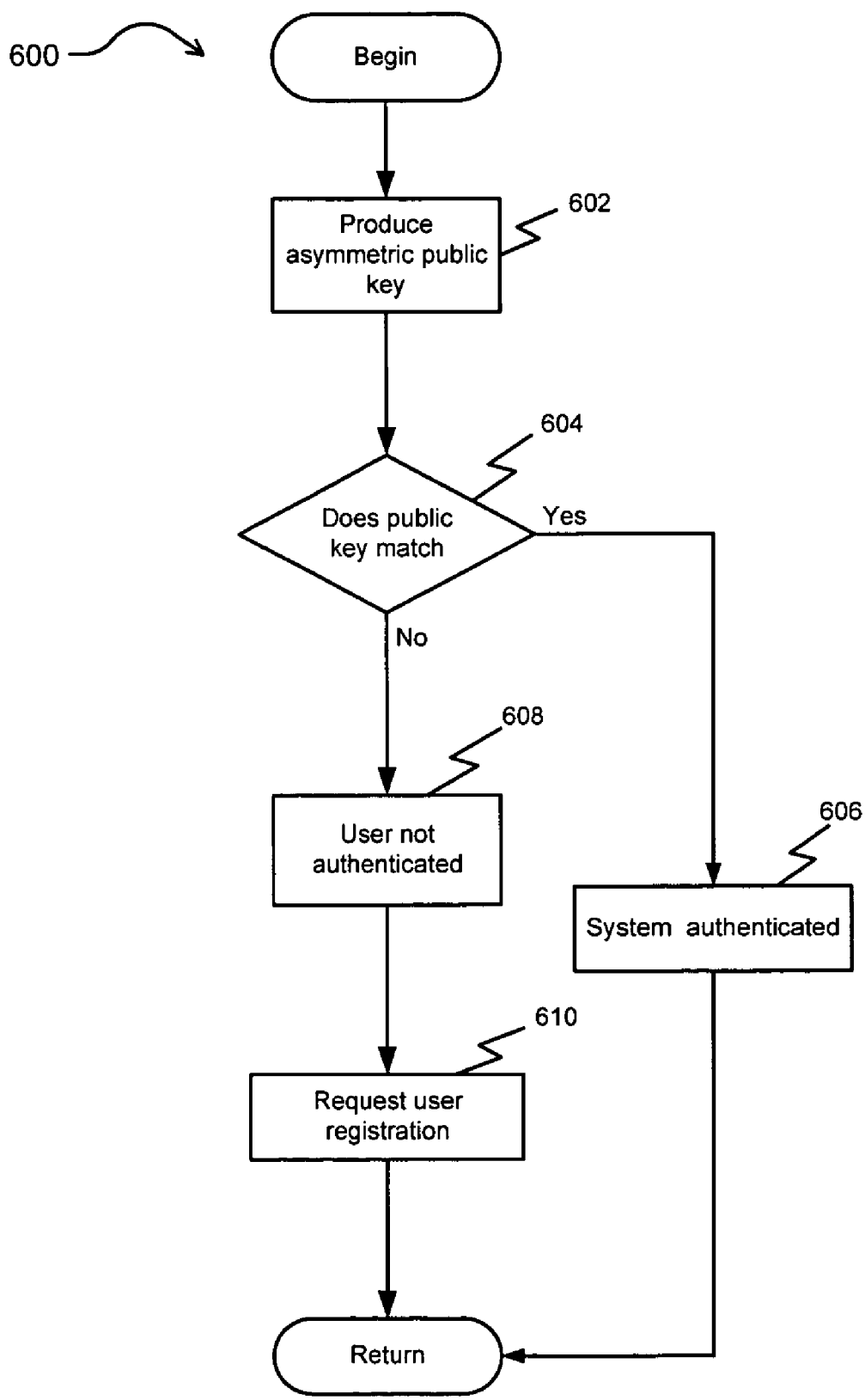
FIG. 6 is a flow diagram illustrating operational characteristics involved in authenticating a system according to an exemplary embodiment.

FIG. 6 is a flowchart illustrating a method for determining authenticity of a server, client, system, or web site according to an exemplary embodiment, generally at 600. According to aspects of method 600, processing begins with produce operation 602. Produce operation 602 may include the user/client producing proof of knowledge of the asymmetric public key to the server for verification of the identity of the user/client. The production of the proof of knowledge of the asymmetric public key by the client and/or the server may constitute proof of an ongoing relationship. That is the client and server may have previously exchanged information. The client may also utilize a corresponding private asymmetric key to indicate a prior visit and/or exchange of information with the server. Furthermore, the client may demonstrate knowledge of an asymmetric public key by having stored the key pair or by recreating the asymmetric key pair utilizing the information used to originally create the asymmetric public key. Control then passes to query operation 604.

Query operation 604 includes determining whether the asymmetric public key produced matches asymmetric public key saved and/or recreated and/or decrypted and/or previously stored by the client. Since the client may have saved a corresponding asymmetric public key, the asymmetric public key may be compared to determine if the server has been previously accessed. Furthermore, the client may utilize the identity key and the original master key, among other information to recreate the asymmetric public key to determine if the server has been previously accessed.

If the asymmetric public keys match, control passes to system authenticated 606. This indicates that the client has previously accessed the server and stored and/or associated an asymmetric public key with the server. The system authenticated may be the server and/or the client. The client and/or server may optionally request further assurances of the identity of the other before authenticating the identity of the other. This may be to determine if an unidentified rogue has surreptitiously acquired a key. The further assurances may include sending a message or challenge to the other, which can only be decrypted and/or answered utilizing the corresponding key or information previously disclosed, among other information.

If the asymmetric public keys do not match, or an asymmetric public key is not produced, then a user is not authenticated 608. After it is determined that a user is not authenticated 608, control passes to the request function 610. Request function 610 may include requesting an identity key from the server, or requesting for more information from the client by the server. If a client has previously accessed a server, or website, and this function is initiated, the user and/or server may have some indication that the website is not authentic or the client is not whom they purport to be. This may also indicate to the user or server that another entity is attempting to obtain identity information from the principal. This may also indicate that the server or client has lost the asymmetric public or private key, or the server or client has been tampered with. With any of these scenarios, the user of the client or the server may have an indication that this system is not to be trusted and caution should be used when any information is disclosed to the other.

The logical operations of the various embodiments of the exemplary embodiments may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

Although the exemplary embodiments have been described in language specific to computer structural features, methodological acts and by computer readable media, it is to be understood that the exemplary embodiments defined in the appended claims is not necessarily limited to the specific structures, acts or media described. As an example, different formats other than XML may be used to encode identification information. Therefore, the specific structural features, acts and mediums are disclosed as exemplary embodiments implementing the claimed invention.

The various embodiments described above are provided by way of illustration only and should not be construed to limit this disclosure. Those skilled in the art will readily recognize various modifications and changes that may be made to the present disclosure without following the exemplary embodiments and applications illustrated and described herein, and without departing from the true spirit and scope of the present disclosure, which is set forth in the following claims.

What is claimed is:

1. A method of creating asymmetric security keys for authenticating previous interaction with each of a plurality of servers, comprising:
   receiving a first identity key associated with a first server of the plurality of servers;
   generating a first master key corresponding to the first server;
   creating one or more seeds by utilizing an encryption function of the first identity key and the first master key;
   utilizing the one or more seeds to create an asymmetric public and an asymmetric private key pair corresponding to the first server; and
   requesting the first server to store the asymmetric public key;
   storing the asymmetric private key at a client; and
   authenticating previous interaction with the first server, comprising:
       when proof of knowledge of the asymmetric public key is required by the first server, presenting proof of knowledge of the asymmetric public key to the first server and accessing the first server without sending the asymmetric private key; and when proof of possession of the asymmetric private key is required in addition to the proof of knowledge of the asymmetric public key by the first server, presenting proof of possession of the asymmetric private key to the first server and accessing the first server.

2. The method of claim 1, wherein creating the one or more seeds further comprises utilizing one or more constants.

3. The method of claim 1, further comprising utilizing the asymmetric public key to determine if the client has previously accessed the first server.

4. The method of claim 1, further comprising
responsive to determining that the client has previously accessed the first server, accessing the first server.

5. The method of claim 1, further comprising utilizing the asymmetric public key to authenticate the first server.

6. The method of claim 1, wherein the generating of the first master key comprises generating a random number.

7. The method of claim 1, wherein the creating the one or more seeds comprises utilizing a hash function of the first identity key, the first master key, and a constant.

8. The method of claim 1, wherein the first server comprises a web server.

9. The method of claim 1, further comprising creating a symmetric key utilizing the asymmetric key pair as seed.

10. The method of claim 1, wherein the asymmetric public key is based, at least in part, on the first identity key.

11. The method of claim 1, wherein receiving the first identity key comprises receiving a certificate associated with a web site.

12. A system for authenticating previous interaction with one or more servers utilizing an asymmetric key pair comprising:
a processor;
a communication channel connected with the processor; and
a memory coupled with and readable by the processor, the memory containing a series of instruction that, when executed by the processor, cause the processor to:
receive a first identity key associated with a first server;
generate a first master key;
create a seed by utilizing an encryption function of the first identity key and the first master key;
utilize the seed to create an asymmetric private and asymmetric public key pair; and
request the first server to store the asymmetric public key;
store the asymmetric private key at a client;
authenticate previous interaction with the first server, comprising:
request proof of knowledge of the asymmetric public key from the first server; and
upon receipt of the proof of knowledge of the asymmetric public key, access the first server.

13. The system of claim 12, wherein the generating the first master key comprises generating a random number.

14. The system of claim 12, wherein creating the seed comprises utilizing a hash function of the first identity key, the first master key, and one or more constants.

15. The system of claim 12, further comprising receiving a request for authentication from the first server based at least in part upon the asymmetric public key.

16. A computer storage medium encoding a computer program of instructions for executing a computer implemented method for authenticating previous interaction with one or more servers, the method comprising:
receiving a first identity key associated with a first server;
generating a first master key;
creating one or more seeds by utilizing an encryption function of the first identity key, the first master key, and one or more constants;
utilizing the one or more seeds to create an asymmetric private and asymmetric public key pair;
requesting the first server to store the asymmetric public key;
storing the asymmetric private key at a client;
authenticating previous interaction with the first server, comprising:
presenting proof of knowledge of the asymmetric public key to the first server;
receiving a request from the first server for proof of possession of the asymmetric private key;
presenting proof of possession of the asymmetric private key to the first server; and
receiving an indication from the first server that the client is authenticated and that access is permitted.

17. The computer storage medium of claim 16, wherein the asymmetric key functions as a symmetric key.

18. The computer storage medium of claim 16, wherein the encryption function is a hash function of the first identity key, the first master key, and one or more constants.

* * * * *